United States Patent [19]
Gardiner

[11] 3,917,875
[45] Nov. 4, 1975

[54] DESSERT COMPOSITION
[75] Inventor: David Stirling Gardiner, Tweedmouth, England
[73] Assignee: General Foods Limited, Banbury, England
[22] Filed: May 2, 1974
[21] Appl. No.: 466,584

[52] U.S. Cl. ............... 426/573; 426/576; 426/578
[51] Int. Cl.² ............................................. A23L 1/04
[58] Field of Search ............ 426/167, 168, 169, 350

[56] References Cited
FOREIGN PATENTS OR APPLICATIONS
1,072,768  6/1967  United Kingdom................ 426/168

*Primary Examiner*—Jeanette M. Hunter
*Attorney, Agent, or Firm*—Bruno P. Struzzi; Thomas V. Sullivan

[57] ABSTRACT

A dessert composition is prepared by combining a single powder mix and milk. The powder mix contains cold water soluble gelatin which in combination with the other ingredients prevents significant precipitation of milk protein even at low pH. The mix is suitable for the preparation of a yogurt type of dessert.

10 Claims, No Drawings

DESSERT COMPOSITION

BACKGROUND OF THE INVENTION

This invention relates to a process for the preparation of an instant dessert having a texture and flavour similar to yogurt and to a composition for preparing such a dessert. The composition comprises a dry powder mix which may be whisked with milk to form a dessert which is like yogurt in both texture and flavor.

Prior to the present invention, compositions for acidic desserts similar to yogurt and containing milk or milk products, comprised a two-mix system, where one mix contained the acid component, and the other contained, or was prepared with milk or milk products. This invention is unique in that it provides a single powder mix, which may be made up with milk and has a distinct acidic flavor similar to yogurt.

SUMMARY OF THE INVENTION

In accordance with the invention there is provided a dessert composition which comprises 5.0 to 20.0% by weight of a cold water-soluble gelatin, 0.2 to 5.0% by weight of a stabilizer, 5.0 to 25.0% by weight of a pregelatinized starch, 2.0 to 7.0% by weight of a common food acid, 40 to 75% by weight of a sweetening agent and optionally up to 10% by weight of an emulsifier. Optionally the composition may also contain dried yogurt powder in an amount up to 25%, preferably 5%, by weight to increase the similarity of the flavor to that of fresh yogurt.

In order to prepare a yogurt-like dessert the powder mix is whisked with milk. It is preferable, though not essential, that the made-up dessert be chilled in a refrigerator for half an hour before serving.

DESCRIPTION OF THE PREFERRED EMBODIMENT

Normally high acidity in a dessert composition would precipitate the proteins in the milk or milk products when the pH is below their iso-electric point of pH 4.7 and the precipitated solids would curdle. However, surprisingly, it has been found that by a unique blend of gelatin, stabilizer, starch and food acid this precipitation is limited in effect so that a smooth texture is obtained in the final made-up dessert. According to this invention, it has been found that by incorporating the acid in a unique base mix, with or without buffer, the pH in the made-up dessert may be at least as low as pH 3.9 without apparent curdling in the made-up dessert. Although the milk protein is almost certainly precipitated to some extent, this is minimised through the unique blend of ingredients. Also, it is suggested that on make up, the high initial viscosity prevents excessive curdling of the protein, so that any precipitated protein is present only as finely dispersed particles. These particles do not affect the smooth texture of the prepared dessert. Normally when milk is added to an acidic dessert where the pH of the prepared dessert is below the iso-electric point of milk protein, significant curdling occurs and the final texture is very granular and powdery.

Accordingly, the present invention provides a product and process for the preparation of an instant dessert with a flavor and texture similar to yogurt, which comprises whisking with milk a powder mix comprising 5.0 to 20.0% by weight of a cold water-soluble gelatin, 0.2 to 5.0% by weight of a stabilizer, 5.0 to 25.0% by weight of a pregelatinized starch, 2.0 to 7.0% by weight of a common food acid, 40 to 75% by weight of a sweetening agent and optionally up to 10% by weight of an emulsifier.

The powder mix may also contain flavoring agents and dried yogurt powder, in an amount up to 25% by weight, to increase the similarity of the flavour to fresh yogurt. Preferably the dessert is prepared by whisking the powder mix with cold milk and allowing it to stand in a refrigerator, or other cold place, for 30 minutes until it develops a texture similar to yogurt.

Examples of the various constituents which make up the powder mix of the present invention are well known in the art.

The cold water-soluble gelatin is preferably a spray dried mixture of a readily soluble carrier and a gelatin produced by the acid or alkali method. The preferred cold water-soluble gelatin is Setkold 31 (from P. Leiner and Sons) which comprises a spray dried mixture of corn syrup solids and a lime ossein gelatin. The cold water-soluble gelatin provides body and a small degree of gelation set. It is present in the composition in an amount of 5.0 to 20.0% preferably 11.0 to 15.0%, by weight.

Particularly suitable stabilizing agents include vegetable gums, alginates, carrageens, and cellulose derivatives. The preferred agent is a guar gum which is stable under acid conditions. The amount of stabilizer used in the powder composition of the invention is from 0.2 to 5.0%, preferably 0.5 to 1.0% by weight. The guar gum used in this invention provides initial viscosity on make up, which is thought to prevent apparent curdling in the prepared dessert.

The pregelatinized starch may be one of those commonly employed in food products as a thickener or stabilizer. It may be dervied from potato starch, tapioca starch or maize starch, and is used in an amount of 5.0 to 25.0% preferably 11.0 to 16.0%, by weight. A preferred starch is potato starch which acts as a thickening and bodying agent.

As used herein, the term 'common food acid' is intended to mean citric, tartaric, acetic, malic, lactic, fumaric, ascorbic, maleic, adipic, and phosphoric acids. The amount of acid used in the composition is 2.0 to 7.0% preferably 3.0 to 4.5%, by weight. The preferred acid is citric acid which imparts the tangy, acidic flavor associated with this kind of dessert.

The emulsifier used may be one or more of a large number commonly used in the food industry. Representative emulsifiers include mono-glycerides, mono-diglycerides, polyglycerol esters, propylene glycol esters, lactic acid esters, citric acid esters, diacetyl tartaric acid esters, sorbitan esters, polyoxy ethylene sorbitan esters, calcium and sodium stearyl lactates, lecithin and tetraglycerol esters of dimerised soya bean oil. The preferred emulsifier is Beatreme E.V. (from Beatrice Foods) which is a mono-diglyceride and is the emulsifier used in the Examples 1 and 2 hereinafter. This emulsifier improves the smoothness of the texture of the dessert. The amount of emulsifier when used may be up to 10%, preferably about 1%, by weight.

The sweetening agent is preferably one or more sugars. The preferred sugar is sucrose, which acts both as a sweetener and a bulking agent. The amount of sweetening agent used is 40 to 75%, preferably 58 to 68%, by weight. Dietetic sweeteners can be effectively used and may be preferably mixed with a bulking agent.

A natural yogurt powder may be included in the composition to enhance the natural flavor of the prepared dessert. This yogurt powder may be dried by freeze drying, spray drying, roller drying or any other commercial drying technique. The preferred yogurt powder is spray dried. The amount of yogurt powder in the composition may vary from 0 to 25%, preferably about 5%, by weight.

The powder mix may also include additional sugar, flavoring, coloring agent or even real fruit.

The amounts of the above described ingredients present in the powder mix may be varied within the stated range to provide a smooth, creamy texture similar to natural yogurt. The quoted ranges for citric acid, sugar, and yogurt powder if required, will provide an acidic taste similar to yogurt.

The following Examples illustrate the invention and the manner in which it may be performed. All percentages are by weight.

EXAMPLE 1

This Example illustrates the preparation of a dessert similar to yogurt, comprising a single powder mix which is whisked with cold milk.

|  | % |
| --- | --- |
| Sugar | 58.00 |
| Cold water-soluble gelatin | 13.00 |
| Yogurt powder | 12.00 |
| Pregelatinized starch | 11.00 |
| Citric acid | 3.50 |
| Guar gum | 1.00 |
| Emulsifier | 1.00 |
| Color and Flavor | as required |

This powdered dessert is whisked with milk in the ratio of 100 parts by weight of powder to 400 to 600 parts by weight of milk. After whisking the prepared dessert is chilled for half an hour, resulting after this time, in an acidic, dessert similar to yogurt which is ready for serving.

EXAMPLE 2

This Example illustrates the preparation of a dessert comprising a single powder mix without yogurt powder, which is whisked with cold milk.

|  | % |
| --- | --- |
| Sugar | 66.00 |
| Cold water-soluble gelatin | 14.50 |
| Pregelatinized starch | 13.00 |
| Citric acid | 4.00 |
| Guar gum | 1.00 |
| Emulsifier | 1.00 |
| Color and Flavor | as required. |
| The preparation is the same as for Example 1. | |

EXAMPLE 3

This Example illustrates the preparation of a dessert comprising a single powder mix without an emulsifier but including yogurt powder, the composition being whisked with cold milk.

|  | % |
| --- | --- |
| Sugar | 65.5 |
| Cold water-soluble gelatin | 13.4 |
| Yogurt powder | 5.0 |
| Pregelatinized starch | 11.3 |
| Citric acid | 3.9 |
| Guar gum | 0.5 |
| Color and Flavor | as required. |
| The preparation is the same as for Example 1. | |

EXAMPLE 4

This Example illustrates the preparation of a dessert comprising a single powder mix without either an emulsifier or yogurt powder, the composition being whisked with cold milk.

|  | % |
| --- | --- |
| Sugar | 67.5 |
| Cold water-soluble gelatin | 11.6 |
| Pregelatinized starch | 15.4 |
| Citric acid | 4.1 |
| Guar gum | 0.6 |
| Color and Flavor | as required. |
| The preparation is the same as for Example 1. | |

What is claimed is:

1. A powdered dessert composition suitable for mixing with milk to obtain an acidic dessert consisting essentially of 5.0 to 20.0 percent of a cold water-soluble gelatin, 0.2 to 5.0 percent of a stabilizer, 5.0 to 25.0% of a pregelatinized starch, 2.0 to 7.0 percent of a food acid, 40.0 to 75.0 percent of a sweetening agent, from 0.0 to 25.0 percent yogurt powder, from 0.0 to 10.0 percent of an emulsifier and from 0.0 to an effective amount of color and flavoring ingredients; all percentages being by weight of the powdered dessert composition.

2. The composition of claim 1 wherein the cold water-soluble gelatin is a spray dried mixture of a readily soluble carrier and a gelatin produced by the acid or alkali method and is present at a level of from 11.0 to 15.0 percent by weight.

3. The composition of claim 1 wherein the stabilizer is one or a mixture of gums selected from the group consisting of vegetable gums, alginates, carrageens and cellulose derivatives and is present at a level of from 0.5 to 1.0 percent by weight.

4. The composition of claim 1 wherein the pregelatinized starch is one or a mixture of starches selected from the group consisting of potato starch, tapioca starch and maize starch and is present at a level of from 11.0 to 16.0 percent by weight.

5. The composition of claim 1 wherein the food acid is one or a mixture of acids selected from the group consisting of citric, tartaric, acetic, maleic, lactic, fumaric, ascorbic, malic, adipic, and phosphoric acids and is present at a level of from 3.0 to 4.5 percent by weight.

6. The composition of claim 1 wherein the emulsifier is one or a mixture of emulsifiers selected from the group consisting of mono-glycerides, mono-diglycerides, polyglycerol esters, propylene glycol esters, lactic acid esters, citric acid esters, diacetyl tartaric acid esters, sorbitan esters, polyoxy ethylene sorbitan esters, calcium and sodium stearyl lactates, lecithin and tetraglycerol esters of dimerised soya bean oil and is present at a level of about 1.0 percent by weight.

7. The composition of claim 1 wherein the cold water-soluble gelatin is a spray dried mixture of corn syrup solids and ossein gelatin at a level of from 11.0 to 15.0 percent by weight, the stabilizer is guar gum at from 0.5 to 1.0 percent by weight, the pregelatinized starch is potato starch at a level of from 11.0 to 16.0 percent by weight, and the food acid is citric acid at a level of from 3.0 to 4.5 percent by weight.

8. The composition of claim 7 wherein the emulsifier is mono-diglyceride at a level of about 1.0 percent by weight.

9. The composition of claim 7 wherein the yogurt powder is at a level of about 5.0 percent by weight.

10. The composition of claim 9 wherein the emulsifier is mono-diglyceride at a level of about 1.0 percent by weight and the sweetening agent is sucrose at a level of from 58.0 to 68.0 percent by weight.

* * * * *

UNITED STATES PATENT OFFICE
CERTIFICATE OF CORRECTION

PATENT NO. : 3,917,875
DATED : November 4, 1975
INVENTOR(S) : David Stirling Gardiner It is certified that error appears in the above-identified patent and that said Letters Patent are hereby corrected as shown below:

On the front page, following line [21] Appl. No.: 466,584, claim to convention priority should be inserted -- [30]  Foreign Application Priority Data
         May 3, 1973    United Kingdom    21143/73 --

Signed and Sealed this first Day of June 1976

[SEAL]

Attest:

RUTH C. MASON
*Attesting Officer*

C. MARSHALL DANN
*Commissioner of Patents and Trademarks*